United States Patent [19]

Bieg

[11] Patent Number: 5,341,574
[45] Date of Patent: Aug. 30, 1994

[54] COORDINATE MEASURING MACHINE TEST STANDARD APPARATUS AND METHOD

[75] Inventor: Lothar F. Bieg, Louisville, Colo.

[73] Assignee: The United States of America as represented by the Department of Energy, Washington, D.C.

[21] Appl. No.: 83,229

[22] Filed: Jun. 29, 1993

[51] Int. Cl.$^5$ .............................................. G01B 5/03
[52] U.S. Cl. ........................................ 33/502; 33/567; 73/1 J
[58] Field of Search ............... 33/502, 503, 567, 567.1, 33/1 J; 73/1 J

[56] References Cited

U.S. PATENT DOCUMENTS

| | | | |
|---|---|---|---|
| 2,768,449 | 10/1956 | Fry | 33/502 |
| 4,437,151 | 3/1984 | Hurt et al. | 364/571 |
| 4,523,450 | 6/1985 | Herzog | 73/1 J |
| 4,577,285 | 3/1986 | Bailey | 33/567 |
| 4,777,818 | 10/1988 | McMurtry | 73/1 J |
| 4,819,195 | 4/1989 | Bell et al. | 364/571.05 |
| 4,866,643 | 9/1989 | Dutler | 364/571.02 |
| 4,884,348 | 12/1989 | Zeller et al. | 33/502 |
| 4,908,951 | 3/1990 | Gurny | 33/503 |
| 4,932,136 | 6/1990 | Schmitz et al. | 33/567 |
| 4,945,501 | 7/1990 | Bell et al. | 364/571.05 |
| 4,958,438 | 9/1990 | Hemmelgarn | 33/503 |
| 4,962,591 | 10/1990 | Zeller | 33/567 |
| 4,982,504 | 1/1991 | Söderberg et al. | 33/502 |
| 5,014,444 | 5/1991 | Breyer | 33/502 |
| 5,111,590 | 5/1992 | Park | 33/502 |
| 5,214,857 | 6/1993 | McMartry et al. | 33/502 |

FOREIGN PATENT DOCUMENTS

WO89-11631  11/1989  World Int. Prop. O. ............ 33/502

Primary Examiner—William A. Cuchlinski, Jr.
Assistant Examiner—G. Bradley Bennett
Attorney, Agent, or Firm—Luis M. Ortiz; James H. Chafin; William R. Moser

[57] ABSTRACT

A coordinate measuring machine test standard apparatus and method which includes a rotary spindle having an upper phase plate and an axis of rotation, a kinematic ball mount attached to the phase plate concentric with the axis of rotation of the phase plate, a groove mounted at the circumference of the phase plate, and an arm assembly which rests in the groove. The arm assembly has a small sphere at one end and a large sphere at the other end. The small sphere may be a coordinate measuring machine probe tip and may have variable diameters. The large sphere is secured in the kinematic ball mount and the arm is held in the groove. The kinematic ball mount includes at least three mounting spheres and the groove is an angular locating groove including at least two locking spheres. The arm may have a hollow inner core and an outer layer. The rotary spindle may be a ratio reducer. The device is used to evaluate the measuring performance of a coordinate measuring machine for periodic recertification, including 2 and 3 dimensional accuracy, squareness, straightness, and angular accuracy.

25 Claims, 4 Drawing Sheets

COORDINATE MEASURING MACHINE TEST STANDARD APPARATUS AND METHOD

The U.S. Government has rights in this invention pursuant to contract No. DE-AC04-90DP62349 between EG&G Rocky Flats, Inc. and the U.S. Department of Energy.

FIELD OF THE INVENTION

This invention relates to a device for evaluating the inspection and dimensional accuracy performance of coordinate measuring machines.

BACKGROUND OF THE INVENTION

The performance monitoring of coordinate measuring machines is an issue of concern on a world wide basis. Coordinate measuring machines perform an important function in industrial quality assurance. Coordinate measuring machines are utilized to inspect the products of numerically controlled machine tools, as layout machines before machining, and to check feature locations after machining. Because of the need for accurate measurement of components produced, the coordinate measuring machine has become an important piece of equipment for both small job shops and large manufacturing plants.

Most coordinate measuring machine inspection systems are recalibrated periodically to verify compliance with original manufacturing specifications. Because this recalibration task demands activities that must be performed over a period of several days, recertification is often performed only after many months of multi-shift inspection use of the coordinate measuring machine. If the coordinate measuring machine system is found to be out of specification, a factory service representative is often needed to correct the evaluated source of tolerance deviation. In addition, the adjustment of the coordinate measuring machine can be an extremely time-consuming procedure. Finally, and of more importance to the coordinate measuring machine user, a product may have been inspected and possibly accepted by a coordinate measuring machine, for a long period of time, until the system is examined and found to be out of specification.

Many types of equipment are needed for the task of evaluating individual coordinate measuring machine conditions and their relation to possible inaccuracies experienced during inspection applications. In all cases, six degrees of freedom, including pitch, yaw, roll, horizontal and vertical straightness, and linear displacement or positioning performance of each linear slide are of importance. Furthermore, the relationship or squareness between each pair of axes must be evaluated and found to be within a specified tolerance band.

For a common three axes coordinate measuring machine a total of twenty-one individual sources of error may be specified. Additionally, long periodic errors of the displacement reading system, the hysteresis within the probing system, any backlash per linear axis, and deformation of the reference coordinate system through slide movement or temperature influences must be incorporated. Errors may also be based on the deviation of the comparator principle, often called the Abbe-offset. The influence of these errors forces the recertification task of a coordinate measuring machine to be time consuming, costly, and to require skilled personnel to perform.

Therefore, an object of the invention is to provide a device for evaluating the performance of coordinate measuring machines. This object may be achieved by providing a multi-coordinate measuring machine test standard capable of simply and accurately inspecting a coordinate measuring machine.

SUMMARY OF THE INVENTION

To achieve the foregoing and other objects, and in accordance with the purposes of the present invention as described herein, a novel apparatus for evaluating the measuring performance of a coordinate measuring machine for periodic recertification, including 2 and 3 dimensional accuracy, squareness, straightness, angular accuracy, etc, and method for its use are provided. The apparatus, a coordinate measuring machine test standard, comprises a rotary spindle having an upper phase plate and an axis of rotation, a kinematic ball mount attached to the phase plate concentric with the axis of rotation of the phase plate, and a groove mounted at the circumference of the phase plate where an arm assembly rests in the groove. The arm assembly has a small sphere at one end and a large sphere at the other end. The small sphere may be a coordinate measuring machine probe tip and may have variable diameters. The large sphere is secured in the kinematic ball mount and the arm is held in the groove. The kinematic ball mount includes at least three mounting spheres and the groove is an angular locating groove including at least two locking spheres. The arm may have a hollow inner core and an outer layer. The rotary spindle may be a ratio reducer.

In accordance with another aspect of the invention, a method is provided for evaluating the squareness of a coordinate measuring machine using the apparatus of the present invention comprising the steps of evaluating the centerpoints of the small and large spheres in a first position and identifying a first line between the centerpoints, rotating the spindle 90 degrees to a second position, evaluating the centerpoints of the spheres and identifying a second line through the centerpoints at the second position, calculating the angle between the first and second lines, wherein the difference between the calculated and actual angles of the apparatus is defined as the coordinate measuring machine squareness error. The rotary axis of the coordinate measuring machine may be checked using the apparatus by placing the apparatus onto the face plate of the apparatus rotary axis, measuring the small sphere with the apparatus, rotating the apparatus by the rotary spindle ninety degrees clockwise, the rotary axis is rotated ninety degrees counterclockwise by rotation of the apparatus, the small sphere is measured again wherein the difference in location of the sphere is a result of rotary axis error. This process is repeated until the apparatus has been rotated 360 degrees.

Still other objects of the present invention will become readily apparent to those skilled in this art from the following detailed description wherein the preferred embodiment of the invention is described. The invention will be set forth in part in the description that follows and in part will become apparent to those so skilled in the art upon examination of the following or may be learned by practice of the invention. Accordingly, the drawings and descriptions will be regarded as illustrative in nature and not as restrictive.

BRIEF DESCRIPTION OF THE DRAWINGS

The accompanying drawings incorporated in and forming part of the specification illustrate several aspects of the present invention, and together with the description serve to explain the principles of the invention. In the drawings.

DETAILED DESCRIPTION OF THE INVENTION

Figure 1:
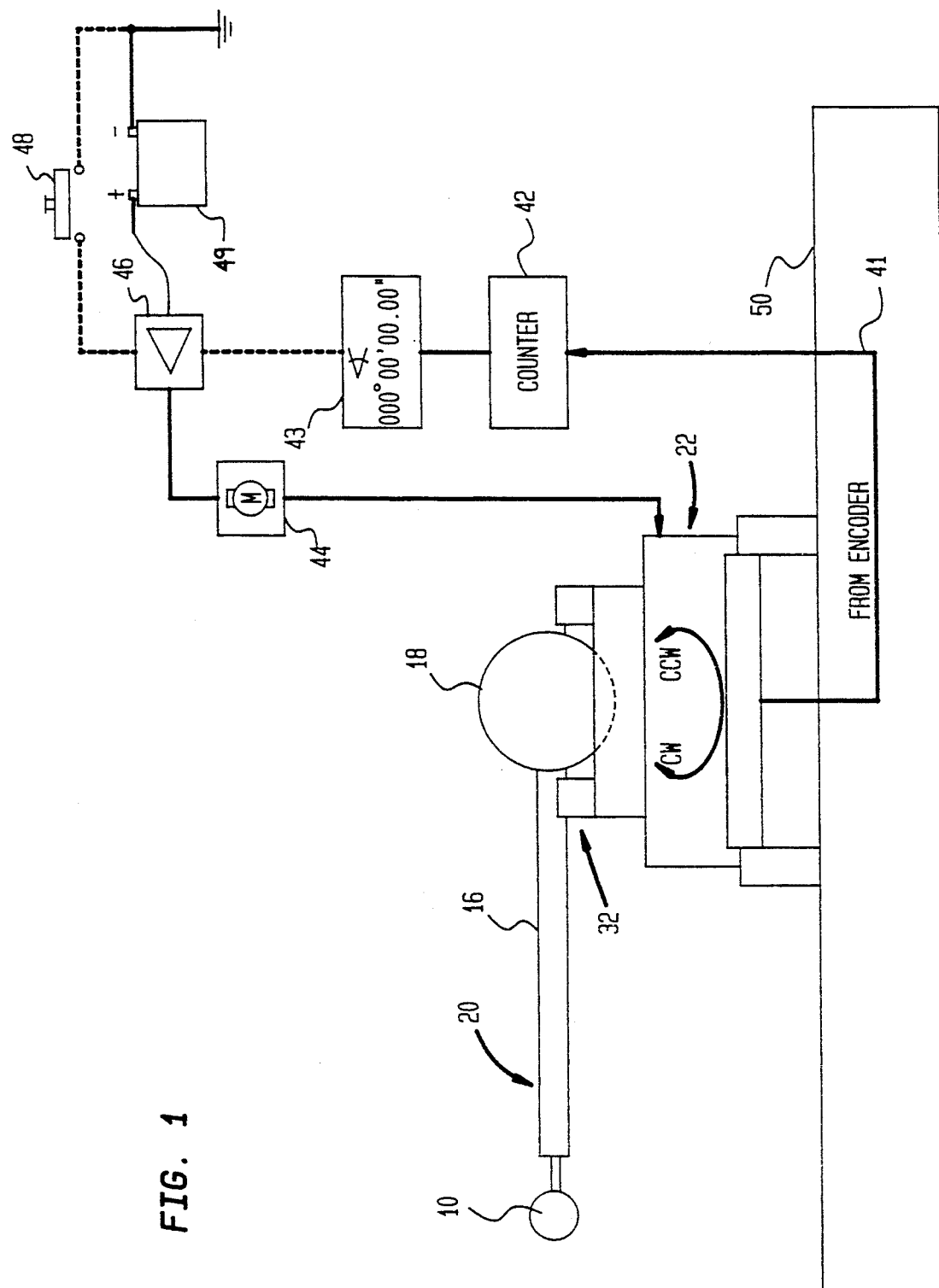
FIG. 1 is a side view of the coordinate measuring machine test standard of the present invention.
Figure 2:
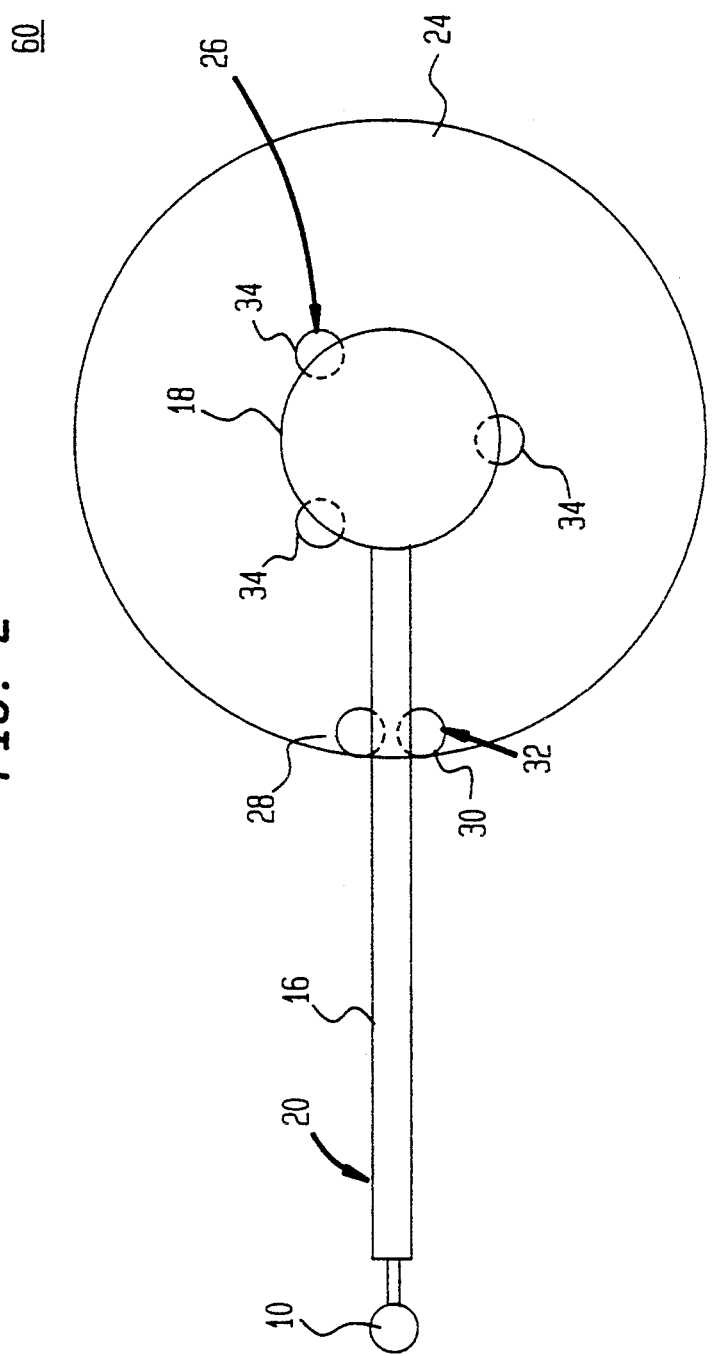
FIG. 2 is a plan view of the coordinate measuring machine test standard of FIG. 1.
Figure 3B:
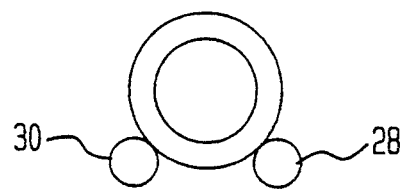
FIG. 3b is a side view of the groove of the coordinate measuring machine test standard of FIG. 1.
Figure 3A:
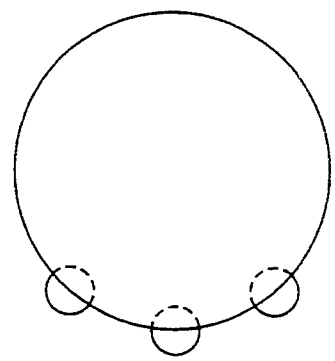
FIG. 3a is a side view of the kinematic ball mount of the coordinate measuring machine test standard of FIG. 1.

It has long been known for a sphere to be a relevant feature for providing data about the measurement performance of an inspection system. Coordinate measuring machines commonly use about a one inch sphere for the purpose of calibrating probe tips. The actual probe tip of a coordinate measuring machine is also a sphere. Spheres can be made accurately with a high roundness tolerance out of a variety of materials. A coordinate measuring machine involves all three of its linear axes to distribute a number of measuring points about the surface of a sphere, whereby the evaluation software can calculate the centerpoint and geometry of the sphere.

Referring now to FIGS. 1–3b, coordinate measuring machine test standard 60 is shown. Standard 60 is provided with arm assembly 20 which includes small sphere 10 attached to the distal end of arm 16. Small sphere 10 may be a part of an actual coordinate measuring machine probe tip assembly. These assemblies, in different shapes and dimensions, come with all types of coordinate measuring machines. The tip of each probe tip assembly is a sphere, preferably made out of industrial ruby or hardened steel. The threaded end of the probe tip assembly screws into one end of arm 16. Arm 16 is mounted, at its proximal end, to large sphere 18. Small sphere 10, arm 16, and large sphere 18 form arm assembly 20. Arm assembly 20 may be handled as a single unit for cleaning, independent evaluation, and safe storage purposes.

The length of arm 16 of test standard 60 may vary depending on the size of the coordinate measuring machine to be evaluated. Arm assembly 20, preferably, is certified and traceable for its total length, as defined by the two outermost points between small distal sphere 10 and large central sphere 18 by the National Institute of Standards and Technology. Distance d between the center point of small sphere 10 and the center point of large sphere 18 preferably is also certified as an independent distance. In this manner, arm assembly 20 may be measured in length using two opposing points and at the same time provide information on the distance based on the center points of spheres 10, 18. Arm assembly 20, preferably, is constructed of a conventional material with a low thermal expansion coefficient and high stiffness, for example, alumina-ceramic.

Rotary spindle 22 of coordinate measuring machine test standard 60 is provided with upper phase plate 24. Upper phase plate 24 holds kinematic ball mount 26. Kinematic ball mount 26 is secured concentrically along its axis of rotation. Kinematic ball mount 26 is formed by spheres 34.

Groove 32 is defined by two additional spheres 28, 30, and is mounted close to the circumference of upper phase plate 24. Arm 16 rests in groove 32. In a further embodiment, groove 32 may be defined by cylindrical pins 32.

As arm assembly 20 is positioned by movement of large sphere 18 in kinematic ball mount 26, arm 16 rests in groove 32 and is secured. Movement is provided by motor 44 under control of a computer operating upon counter 42. Counter 42 receives encoder data by way of line 41 and applies energy to motor 44 from battery 49 by way of amplifier 46. Additionally, a user may use switch 48 to energize motor 44. Both large sphere 18 and arm 16 are held within kinematic mount 26 and groove 32, respectively, by mechanical means. Kinematic ball mount 26 assures accuracy with a high degree of repeatability each time arm assembly 20 is removed and replaced.

Rotary spindle 22 may consist of a cycloidal reducer. Rotary spindle 22 comprises a circular disc having a sine wave ground into its circumference. The contacting internal surfaces of rotary spindle 22 roll against each other rather than slide, as with gear teeth, thus eliminating the need to use gears to transmit motion.

Rotary spindle 22 includes three major moving parts: a high speed input shaft mounted to an eccentric bearing assembly, a cycloid disc, and a low speed shaft assembly. Speed is reduced through the eccentric motion of the cycloid disc. A wide range of ratios is achieved ranging from 10:1 to 1000:1 reduction.

Zero backlash is maintained through dimensional pre-loading of cam followers against the cycloid disc. Preferably 100% contact between the force transmitting elements is constantly maintained. This allows smooth transmission of torque with no impact or vibration stresses. Ratio reduction systems are commercially available from numerous sources such as: Dojen Zero Backlash Reducer, Dojen Lenze Company; Orbidrive, Compudrive Corporation; Q-Ten Zero Backlash Reducer, Carlyle Johnson Machine Company; and Zero Backlash Speed Reducer, Lexagon Incorporated. The preferred reduction ratio is 100:1.

Figure 4:
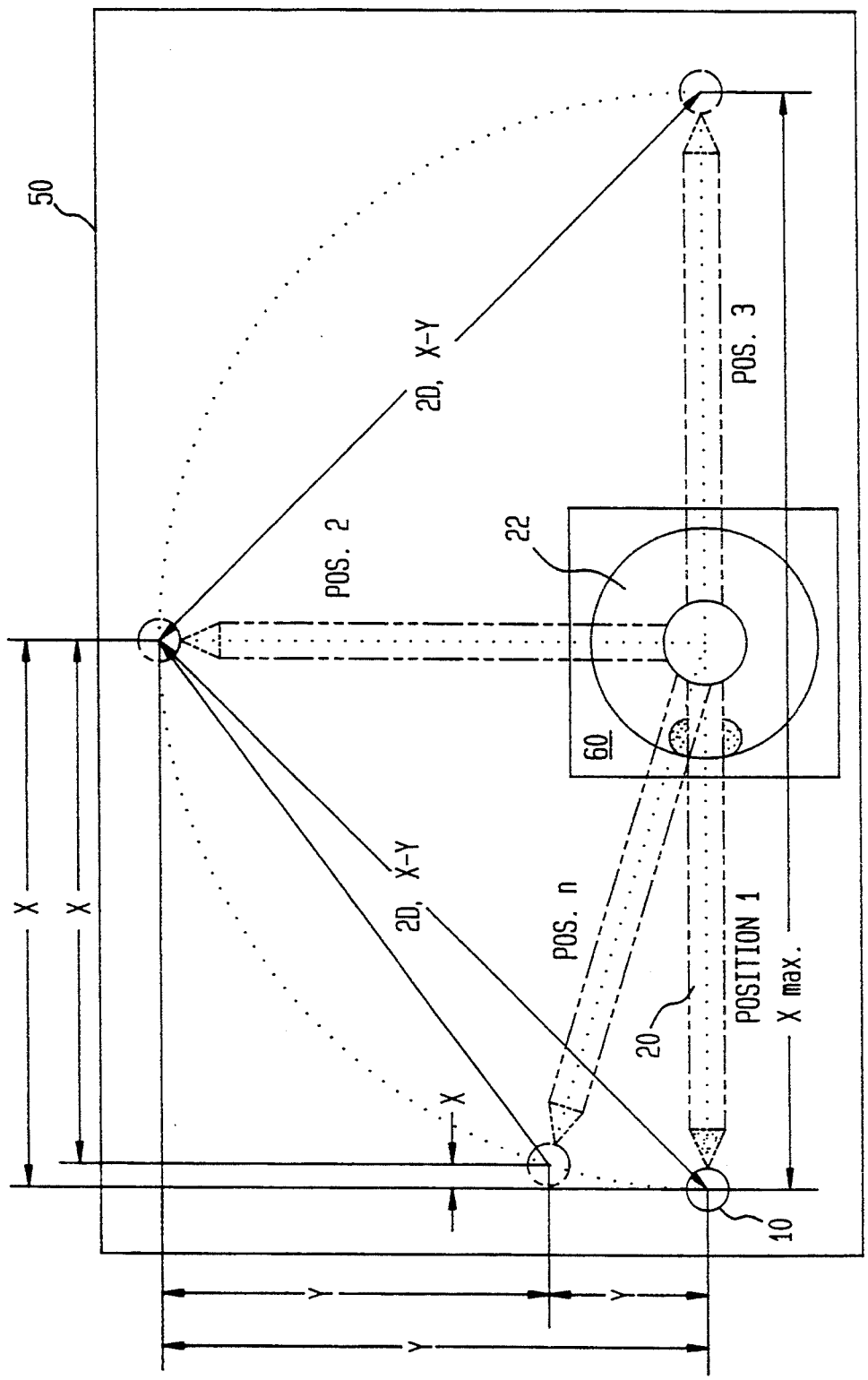
FIG. 4 is a schematic of the functioning of the coordinate measuring machine test standard of FIG. 1.

FIG. 4 illustrates the application of coordinate measuring machine test standard 60 for dimensional accuracy checking of the coordinate measuring machine. Test standard 60 is placed on top of coordinate measuring machine table 50. First, generally small sphere 10 is measured by the coordinate measuring machine using the known measuring method of inspection which is typical of the machine. Small sphere 10 is used as the original reference because any CMM should be able to measure it without much error. Thus, the coordinate measuring machine's performance of measuring small sphere 10 in space is analyzed. Then the method of the invention is used to analyze the CMM.

Small sphere 10, as depicted in FIG. 4 at position 1, is evaluated by the coordinate measuring machine giving x-y-z coordinates about its centerpoint. Rotary spindle 22 is then moved, for example 90 degrees, as depicted in FIG. 4 at position 2. Small sphere 10 is measured again by the coordinate measuring machine.

One application of the device is for short periodic measuring performance evaluation in three dimensions. The following five dimensional displacements of the coordinate measuring machine can be evaluated by a 90 degree movement of test standard 60:

1. coordinate measuring machine performance of measuring small sphere 10 at position 1 (a three-dimensional performance method);
2. distance measurement along the X axis between small sphere 10 centerpoints at positions 1 and 2 (a one-dimensional check comparable to a gage block aligned with one linear coordinate measuring machine axis X, Y, or Z);
3. distance measurement along the Y axis between small sphere 10 centerpoints at positions 1 and 2;
4. diagonal distance in the X-Y plane of the coordinate measuring machine between small sphere 10 centerpoints at positions 1 and 2, (a two-dimensional accuracy check of CMM performance on diagonal moves);
5. coordinate measuring machine performance of measuring small sphere 10 in space at position 2 (again a 3-dimensional performance check at a new location).

Referring again to FIG. 4, position 3 depicts test standard 60 moved 180 degrees. A maximum X length displacement along the coordinate measuring machine X axis is performed. No Y displacement of test standard 60 is present and, thus, the Y coordinate analyzed by the coordinate measuring machine should be the same between small sphere 10 at positions 1 and 3.

Another application of test standard 60 is the evaluation of coordinate measuring machine squareness. The centerpoints of small sphere 10 and sphere 18 are evaluated by the coordinate measuring machine. A line is called between small sphere 10 and sphere 18 centerpoints. Rotary spindle 22 of test standard 60 is rotated 90 degrees to position 2. The centerpoints of small sphere 10 and sphere 18 respectively are measured by the coordinate measuring machine and a line is called through these points. The coordinate measuring machine then calculates the angle between the lines. Any difference between the calculated angle and the actual angle of test standard 60 is defined as the coordinate measuring machine squareness error.

Another application of test standard 60 is the evaluation of coordinate measuring machine straightness along each linear axis. This would be a one directional positioning error, whereby the total coordinate measuring machine axis travel is subdivided into many small moves. Referring again to FIG. 4, small sphere 10 is measured in position 1. Rotary spindle 22 is moved a specific angle to displace small sphere 10. As an example, these displacements may be in one-inch increments. The coordinate measuring machine axis will measure each new location of small sphere 10 and compare its displacement with the incremental displacements of test standard 60. This evaluation can be performed by X-Y, X-Z, or Y-Z axes of the coordinate measuring machine at the same time.

Another application of test standard 60 is for checking the rotary axis of a coordinate measuring machine. Test standard 60 is placed onto the face plate of the coordinate measuring machine rotary axis. Both displays are set to 0, indicating the starting point of the evaluation. The coordinate measuring machine is measuring small sphere 10. Test standard 60 is then rotated by rotary spindle 22. For example, the rotation of test standard 60 may be 90 degrees clockwise. The rotary axis of the coordinate measuring machine is rotated 90 degrees counter-clockwise. This should bring small sphere 10 back to its original location. Small sphere 10 is then measured by the coordinate measuring machine whereby any difference in location of small sphere 10 is a result of a coordinate measuring machine rotary axis error. In the evaluation of a rotary axis, the entire 360 degrees movement subdivided into small increments must be checked.

The location of small sphere 10 is determined by means of mathematical vector equations, derived from the field of trigonometry, translating the angular motion of rotary spindle 22 into linear coordinates in space. The control and readout of coordinate measuring machine test standard 60 will display any subsequent locations of small sphere 60 within the X-Y-Z coordinate system of the coordinate measuring machine. The coordinate measuring machine itself will document numerous measured points in space. Because coordinate measuring machine test standard 60 can be moved from a horizontal (X-Y) to a vertical (X-Z or Y-Z) working attitude, or any location in between, the whole volumetric area of a coordinate measuring machine can be evaluated sequentially. Furthermore, the coordinate measuring machine software can be used to align a part in space, whereby specific features of coordinate measuring machine test standard 60 can be measured. This will make the physical alignment of coordinate measuring machine test standard 60 unnecessary in relation to each linear axis of the coordinate measuring machine. Additionally, and should there be any error in the coordinate measuring machine alignment software routine, this error will become part of the accuracy assessment.

Any error in the form of backlash or hysteresis within the probing system is also part of the accuracy performance test. Each system of the coordinate measuring machine used for dimensional inspection becomes part of the accuracy assessment.

Selecting a ratio reducer to function as rotary spindle 22 for this invention is advantageous for the following reasons. The angular motion of rotary spindle 22 must be detected and digitized into very fine increments. Utilizing today's state-of-the-art optical encoder technology, resolutions of 1 second-of-arc are possible, having the encoder directly coupled with the rotary motion of rotary spindle 22. In the case of the present invention, and due to the use of a ratio reducer, the encoder can be turned up to 1000 times with each full circular motion of phase plate 24.

For example, assume an encoder that produces 81,000 pulses per revolution is used. The 81,000 pulses per revolution are electronically interpolated 16 times. Additionally, the reduction ratio selected for the ratio reducer turns the encoder 100 times. The pulse resolution of rotary spindle 22 can be calculated by multiplying the pulses per revolution of the encoder by the electronic interpolation and turns of the output shaft of the ratio reducer. (i.e., $81,000 \times 16 \times 100 = 129,600,000$). Therefore, the angular motion of upper phase plate 24 is resolved to 129,600,000 pulses/rev., translating into steps of one one-hundredths (1/100) of one arc second.

Further assume that the motion detection system, including the encoder, interpolator, and ratio reducer has a total error of 10 arc seconds within one revolution. Due to the 100:1 reduction, this total error is reduced. Upper phase plate 24 of rotary spindle 22 would therefore gain a total accuracy of one tenth of one arc second, within one full revolution.

Therefore, differentiation must be made between resolution, accuracy, and repeatability. Thus, it must be established that the motion detection system can repeat any location about its circumference within +/−2 arc seconds. Corresponding with earlier statements, this will result in a positioning performance of +/−0.002 arc seconds of upper phase plate 24, and small sphere 10.

In summary, 3 individual numbers can be assigned to:

| RESOLUTION = | 0.01 | ARC SECONDS |
| --- | --- | --- |
| ACCURACY = | 0.10 | ARC SECONDS |
| REPEATABILITY = | +/−0.02 | ARC SECONDS |

Performance verification of coordinate measuring machine test standard 60: It is now known that using the basic angular data of rotary spindle 22, a defined linear distance can be calculated. Assume this distance to be a nominal length of 4 inches according to the angular motion and calculation performed by the test standard system. The coordinate measuring machine may be used to verify this distance by measuring the two ball locations resulting in this 4 inch length. Furthermore, assume that the coordinate measuring machine measures this distance as 4.0002 inches. A discrepancy of 0.0002 inches is apparent.

A four inch certified gage block can be placed at the location of measurement, replacing the distance previously produced by the location of small sphere 10. Based on the coordinate measuring machine measured length of the gage block, the error can be attributed to a test standard performance error or a coordinate measuring machine performance problem.

In a further embodiment of the present invention, rotary spindle 22 of coordinate measuring machine test standard 60 can be moved by a stepper motor (not shown). Because the angular displacement resulting in linear positions does not have to be even and incremental (i.e. exactly 2, 4, 6, 8, 12, 16, 24, inches for instance), the positions reached can be somewhat uncontrolled, as long as the angular distance moved is known and remains stable.

A compact CNC servo system adaptable to a small computer may suffice as a coordinate measuring machine independent control and sphere location recorder. A library of position moves within specific working attitudes may be stored in the computer for the evaluation of predetermined errors as documented earlier. A handbook, similar to that of the use of a laser interferometer for straightness, squareness, etc. may accommodate the test standard outlining each application.

EXAMPLES

I. Assume the length of arm 16 of standard 60 is twenty-four inches and a full 180° angular move is performed. The measurements performed are as follows:

| $P_x1 = L \cos \sphericalangle$ | $P_y1 = L \sin \sphericalangle$ |
| --- | --- |
| $P_x1 = 24 \cos 0 = 24$ | $P_y1 = 24 \sin 0 = 0$ | where: $P_x \ldots, y, \ldots, z$ equals the points in space within the $x$, $y$ or $z$ coordinate; L equals the length of arm 16; and $\sphericalangle$ equals the angular motion performed.

In all cases, point $P_xO$, $P_yO$, and $P_zO$ is the center of rotation of rotary spindle 22 and, therefore, the center point of large sphere 18 within kinematic ball mount 26. All measurements are referenced back to this point in space. $P_x1$, $P_y1$, or $P_z1$ on the other hand is the center point of small sphere 10.

| $P_x2 = L \cos \sphericalangle$ | $P_y2 = L \sin \sphericalangle$ |
| --- | --- |
| $P_x2 = 24 \cos 180 = -24$ | $P_y2 = 24 \sin 180 = 0$ |

Point $P_x1$ has moved forty-eight inches as defined by point $P_x2$. Point $P_y1$ and $P_y2$ have remained 0 because no displacement in the y axis can be calculated once location $P_y2$ is reached.

II. Assume further that the angular motion is 45 degrees away from point $P_x1$ and $P_y1$:

| $P_x3 = L \cos \sphericalangle$ | $P_y3 = L \sin \sphericalangle$ |
| --- | --- |
| $P_x3 = 24 \cos 45$ | $P_y3 = 24 \sin 45$ |
| $P_x3 = 16.970563$ | $P_y3 = 16.970563$ |

In this case, the center point of small sphere 10 has moved 16.970563 inches along the x, and 16.970563 inches along the y axis of the coordinate measuring machine.

In terms of earlier listed accuracy statements, it is known that arm assembly 20 is positioned at any point within a circular motion with an accuracy of 0.1 arc seconds. Therefore,

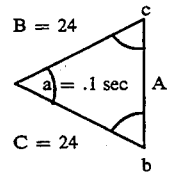

a = 0.1 arc seconds = 0.00001 degrees
b = 180-a-c = 90.00001 degrees
c = 180-a-b = 89.99999 degrees
$A = \frac{C \sin a}{\sin C}$ = 0.0000116 inches =
0.00029 micrometers or simply
A  = B(tan a)
 = 24 × 4.84$^{-07}$
 = 0.0000116 inches The embodiments specifically disclosed herein were chosen and described in order to best illustrate the principles of the invention and its practical application to thereby enable one of ordinary skill in the art to best utilize the invention in various embodiments and with various modifications as are suited for the particular use contemplated. Other embodiments of the invention will be apparent to those skilled in the art from a consideration of this specification and in practice of the invention disclosed herein. It is intended that the specification and the examples be considered as exemplary only, with the true scope and spirit of the invention being indicated in the following claims.

What is claimed is:
1. A coordinate measuring machine test standard apparatus, comprising:
 a rotary spindle having an upper phase plate, said phase plate having a circumference and an axis of rotation;
 a kinematic ball mount attached to said phase plate concentric with said axis of rotation of said phase plate;

a angular locating groove comprising at least two locking spheres mounted at said circumference of said phase plate;

an arm assembly, said arm of said arm assembly having a first end and a second end, said first end having a small sphere attached thereto and said second end having a large sphere attached thereto, said large sphere mounted in said kinematic ball mount and said arm resting in said groove;

means for securing said second sphere in said kinematic ball mount; and means for holding said arm in said groove.

2. The test standard apparatus of claim 1, wherein said kinematic ball mount comprises at least three mounting spheres.

3. The test standard apparatus of claim 1, wherein said large sphere has a diameter larger than said small sphere.

4. The test standard apparatus of claim 1, wherein said arm comprises an arm having a length of twenty-four inches.

5. The test standard apparatus of claim 1, wherein said rotary spindle comprises a ratio reducer.

6. The test standard apparatus of claim 1, wherein said arm comprises an arm having a hollow inner core and an outer layer, said outer layer having a diameter of approximately one-half inch.

7. The test standard apparatus of claim 6, wherein said arm comprises an arm having a length of twenty-four inches.

8. The test standard apparatus of claim 1, wherein said small sphere comprises a sphere that is compatible with a coordinate measuring machine probe tip.

9. The test standard apparatus of claim 8, wherein said small sphere comprises variable diameters.

10. The test standard apparatus of claim 9, wherein said arm assembly comprises an arm assembly formed from a material having a low coefficient of thermal expansion.

11. The test standard of claim 1, further comprising:
counter means for receiving encoder data from a computer means, said data used by said counter to activate movement of said large sphere, wherein said computer means calculates the position of said small sphere; and means for moving said large sphere.

12. A coordinate measuring machine test standard apparatus, comprising:
a rotary spindle having an upper phase plate, said phase plate having a circumference and an axis of rotation;

a kinematic ball mount attached to said phase plate concentric with said axis of rotation of said phase plate;

a angular locating groove comprising at least two locking cylinders mounted at said circumference of said phase plate;

an arm assembly, said arm of said arm assembly having a first end and a second end, said first end having a small sphere attached thereto and said second end having a large sphere attached thereto, said large sphere mounted in said kinematic ball mount and said arm resting in said groove;

means for securing said second sphere in said kinematic ball mount; and means for holding said arm in said groove.

13. The test standard apparatus of claim 12, wherein said kinematic ball mount comprises at least three spheres.

14. The test standard apparatus of claim 12, wherein said large sphere has a diameter larger than said small sphere.

15. The test standard apparatus of claim 12, wherein said arm comprises an arm having a hollow inner core and an outer layer, said outer layer having a diameter of approximately one-half inch.

16. The test standard apparatus of claim 12, wherein said rotary spindle comprises a ratio reducer.

17. The test standard of claim 12, further comprising:
counter means for receiving encoder data from a computer means, said data used by said counter to activate movement of said large sphere, wherein said computer means calculates the position of said small sphere; and means for moving said large sphere.

18. The test standard apparatus of claim 12, wherein said arm comprises an arm having a length of twenty-four inches.

19. The test standard of claim 18, wherein said arm comprises an arm having a length of twenty-four inches.

20. The test standard apparatus of claim 12, wherein said small sphere comprises a sphere that is compatible with a coordinate measuring machine probe tip.

21. The test standard apparatus of claim 20, wherein said small sphere comprises variable diameters.

22. The test standard apparatus of claim 21, wherein said arm assembly comprises an arm assembly formed from a material having a low coefficient of thermal expansion.

23. A method of evaluating short periodic measuring performance evaluation of a coordinate measuring machine using a coordinate measuring machine test standard apparatus, comprising the steps of:
measuring a small sphere at a first position;
measuring the distance along an X-axis between said small sphere centerpoints at said first position and at a second position;
measuring the distance along a Y-axis between said small sphere centerpoints at said first and second positions;
measuring the diagonal distance in the X-Y plane of the coordinate measuring machine between said small sphere centerpoints said positions one and two; and
measuring coordinate machine performance by measuring small sphere in space at position two.

24. A method of evaluating squareness of a coordinate measuring machine using a coordinate measuring machine test standard apparatus, comprising the steps of:
a) evaluating the centerpoints of said small sphere and said large sphere in a first position, and identify a first line between said centerpoints;
b) rotating said spindle 90 degrees to a second position, evaluate the centerpoints of said spheres and identify a second line through the said centerpoints at the second position; and
c) calculating the angle between said first and second lines, wherein the difference between said calculated angle and the actual angle of the apparatus is defined as the coordinate measuring machine squareness error.

25. A method of checking the rotary axis of the coordinate measuring machine using a coordinate measuring machine test standard apparatus, comprising the steps of:
- a) placing said machine test standard onto said face plate of said machine test standard rotary axis;
- b) measuring a small sphere with said machine test standard;
- c) rotating said machine test standard by said rotary spindle 90 degrees clockwise;
- d) rotating said rotary axis 90 degrees counterclockwise where said small sphere is returned to its original location prior to rotation of said machine test standard;
- e) measuring said small sphere with said coordinate measuring machine wherein any difference in location of said small sphere is a result of coordinate measuring machine rotary axis error; and
- f) repeating steps (c) through (e) until said machine test standard has been checked 360 degrees.

* * * * *